(12) United States Patent  (10) Patent No.: US 8,873,843 B2
Zhu et al.  (45) Date of Patent: Oct. 28, 2014

(54) FAST METHODS OF LEARNING DISTANCE METRIC FOR CLASSIFICATION AND RETRIEVAL

(75) Inventors: Shenghuo Zhu, Santa Clara, CA (US); Chang Huang, Cupertino, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 313 days.

(21) Appl. No.: 13/479,256

(22) Filed: May 23, 2012

(65) Prior Publication Data

US 2012/0308122 A1 Dec. 6, 2012

Related U.S. Application Data

(60) Provisional application No. 61/491,606, filed on May 31, 2011.

(51) Int. Cl.
*G06K 9/62* (2006.01)
(52) U.S. Cl.
CPC ............ *G06K 9/6276* (2013.01); *G06K 9/6201* (2013.01)
USPC ............ 382/159; 382/160; 382/224; 382/225

(58) Field of Classification Search
USPC ......... 382/159, 160, 165, 169, 170, 181, 224, 382/225, 226, 227, 228; 700/47, 50; 706/15, 19, 20, 22, 41
See application file for complete search history.

(56) References Cited

U.S. PATENT DOCUMENTS

2009/0252413 A1* 10/2009 Hua et al. ...................... 382/170
2010/0198764 A1* 8/2010 Harris ............................. 706/20
2011/0013847 A1* 1/2011 Statsenko et al. ............. 382/224

OTHER PUBLICATIONS

Kilian Weinberger, John Blitzer, and Lawrence Saul. Distance metric learning for large margin nearest neighbor classification. In Y. Weiss, B. Scholkopf, and J. Platt, editors, Advances in Neural Information Processing Systems 18, pp. 1473-1480. MIT Press, Cambridge, MA, 2006.

Kilian Q. Weinberger and Lawrence K. Saul. Fast solvers and efficient implementations for distance metric learning. In Proceedings of the 25th International Conference on Machine Learning, Helsinki, Finland, 2008.

* cited by examiner

*Primary Examiner* — Brian Le
(74) *Attorney, Agent, or Firm* — Joseph Kolodka

(57) ABSTRACT

A nearest-neighbor-based distance metric learning process includes applying an exponential-based loss function to provide a smooth objective; and determining an objective and a gradient of both hinge-based and exponential-based loss function in a quadratic time of the number of instances using a computer.

13 Claims, 4 Drawing Sheets

FAST METHODS OF LEARNING DISTANCE METRIC FOR CLASSIFICATION AND RETRIEVAL

The present application claims priority to Provisional Application Ser. No. 61/491,606 filed May 31, 2011, the content of which is incorporated by reference.

BACKGROUND

Nearest neighbor classifier is one of the most popular approaches for classification. It is naturally suitable for tasks involving many classes. For example, there are more than thousands of classes in the case of face recognition and OCR for Chinese characters. The success of nearest neighbor classifier highly depends on the quality of distance metric of data, therefore metric learning has been an important component of machine learning. A learned distance metric can also be transferred to similar tasks. For example, a distance metric can be learned from a group of subjects with many training face images, and use the learned metric to recognize a different group of subjects with only one face image per subject. One major issue of metric learning is its prohibitive computation costs, because the training algorithms typically operate with pairs or triples of training examples.

Many approaches exist for distance metric learning. Unsupervised approaches, such as PCA family, have been widely used. For example, Eigenface has been used for face recognition and gender recognition. In the cases where additional label information is available, supervised approaches may generally lead to higher-quality distance metrics. Among supervised approaches, linear discriminant analysis, such as Fisherface, is widely used because of simplicity and relatively high quality. Machine learning practitioners usually pursue approaches resulting into higher quality metrics, as the cost of computation is decreasing.

To learn metric for nearest neighbor classifiers in many-class problems, we prefer nearest-neighbor-based approaches, because the triple constraints are weaker than pairwise constraints, and directly related to the decision rule of nearest-neighbor classification—in order to correctly classify, essentially we need to ensure the triple-wise relationship that the distance between data and from the same class is smaller than that between and from different classes, while caring less about the absolute values of pair-wise distances. Thereafter in this paper, we will call the triple-wise approach by nearest-neighbor-based metric learning.

SUMMARY

In one aspect, a nearest-neighbor-based distance metric learning process includes applying an exponential-based loss function to provide a smooth objective; and determining an objective and a gradient of both hinge-based and exponential-based loss function in a quadratic time of the number of instances using a computer.

Implementations of the above aspects may include one or more of the following. The method includes adding regularization term to control a generalization error. The method includes adding trace norm constraints to control a generalization error. The method includes using exponential-based loss function to generate a smooth loss objective. A hinge loss function can be used for learning metrics. The method includes using a sorted order to determine the objective and gradient. An exponential-based loss function for learning metrics can be used. A class soft-max distance and between-class soft-min distance can be used to determine the objective and gradient. The soft-max distance and soft-min distance can be:

$$\delta_\pm(x) = \delta_+(x) - \delta_-(x), \delta_+(x)$$
$$= \ln \sum_{y \sim x} \exp(d^2(y, x)), \delta_-(x)$$
$$= -\ln \sum_{z \backslash \sim x} \exp(-d^2(z, x)).$$

The method includes using concavity of $x^p$ ($0 < p1 < 1$) and $\log(1+b\,x)$ ($b>0$) to determine an up-bound of a loss function. The learned distance metric can be used to classify, recognize or retrieve data. The regularization terms and constraint terms control generalization error and reduce overall error. The loss function and its gradient can be:

$$l = E_{x,y \sim x} \frac{1}{N_{x-}} \left[ (1 + d^2(y, x))|Z_{x,y}| - \sum_{z \in Z_{x,y}} d^2(z, x) \right]$$

$$\dot{l} = E_{x,y \sim x} \frac{1}{N_{x-}} \sum_{z \in Z_{x,y}} \{(y-x)(y-x) - (z-x)(z-x)\}$$

$$= \sum_{x,v} w_{x,v}(v-x)(v-x) = X(S - W - W)X$$

where $Z_{x,y}$ is the set of data not belonging to the class of x and satisfying $1+d^2(y,x) \geq d^2(z,x)$, $Y_{x,z}$ is the set of data belonging to the same class of x and satisfying $1+d^2(y,x) \geq d^2(z,x)$, $w_{x,v}$ is $$\frac{|Z_{x,v}|}{NN_{x+}N_{x-}}$$

if v in the same class of x, $$-\frac{|Y_{x,v}|}{NN_{x+}N_{x-}}$$

if v is not in the same class as x. X is an p×N matrix whose j-th column is the feature vector of $x_j$, W is an N×N matrix whose i,j-th element is $w_{x_i,x_j}$ (or simply written as $w_{ij}$), S is an N×N diagonal matrix whose i-th diagonal element is $\Sigma_j(w_{ij}+w_{ji})$, and $NN_{x+}$ is the size of class of x, $N_{x-}$ is the size of data not in the class of x.

The method includes determining an exponential type of surrogate function
$\psi(\xi)=\xi^\rho$, where $\rho \in (0,1]$ where the gradient with respect to the squared distance is $$\frac{\partial \tilde{l}}{\partial d_{ij}^2} = \frac{\rho}{\exp\{(1-\rho)\delta_\pm(x_i)\}} \frac{\exp\{\rho(d_{ij}^2 - \delta_-(x_i))\}}{NN_{x_i+}}$$
$$= w_{ij}, \forall j : x_j \sim x_i$$

$$\frac{\partial \tilde{l}}{\partial d_{ik}^2} = \frac{\rho}{\exp\{(1-\rho)\delta_\pm(x_i)\}} \frac{-\exp\{\rho(\delta_+(x_i) - d_{ik}^2)\}}{NN_{x_i-}}$$
$$= w_{ik}, \forall k : x_k \backslash \sim x_i$$

The method includes determining a logit type surrogate function as:

$$\psi(\xi) = \frac{\ln(1+\beta\xi)}{\ln(1+\beta)},$$

where $\beta>0$ where the gradient with respect to the squared distance is $$\frac{\partial \tilde{l}}{\partial d_{ij}^2} = \frac{\beta}{(1+\beta\exp(\delta_\pm(x_i)))\ln(1+\beta)} \frac{\exp(d_{ij}^2 - \delta_-(x_i))}{NN_{x_i+}}$$
$$= w_{ij}, \forall j : x_j \sim x_i$$

$$\frac{\partial \tilde{l}}{\partial d_{ik}^2} = \frac{\beta}{(1+\beta\exp(\delta_\pm(x_i)))\ln(1+\beta)} \frac{-\exp(\delta_+(x_i) - d_{ik}^2)}{NN_{x_i-}}$$
$$= w_{ik}, \forall k : x_k \setminus \sim x_i$$

The method includes determining a gradient matrix as $$\tilde{l} = \sum_{x_i, x_j} w_{ij}(x_i - x_j)(x_i - x_j)^T = X(S - W - W)X$$

where W is an N×N matrix whose i,j-th element is $w_{ij}$, S is an N×N diagonal matrix whose i-th diagonal element is $\Sigma_j w_{ij} + w_{ji}$.

Advantages of the preferred system may include one or more of the following. The system efficiently determines distance metric, which is a crucial component for nearest neighbor classification and information retrieval. The system uses lower-complexity techniques for determining loss functions and their gradients. The system also applies smooth surrogate loss functions to achieve better convergence rates. Evaluation with a number of datasets shows the benefit of efficient computation of gradients and fast convergence rates of smooth loss functions. Overall, the system is advantageous in that it has:

1. Less complexity in the processing.
2. Faster operation in learning the distance metric.
3. Higher quality in the learned metric.

DETAILED DESCRIPTION

Figure 1:
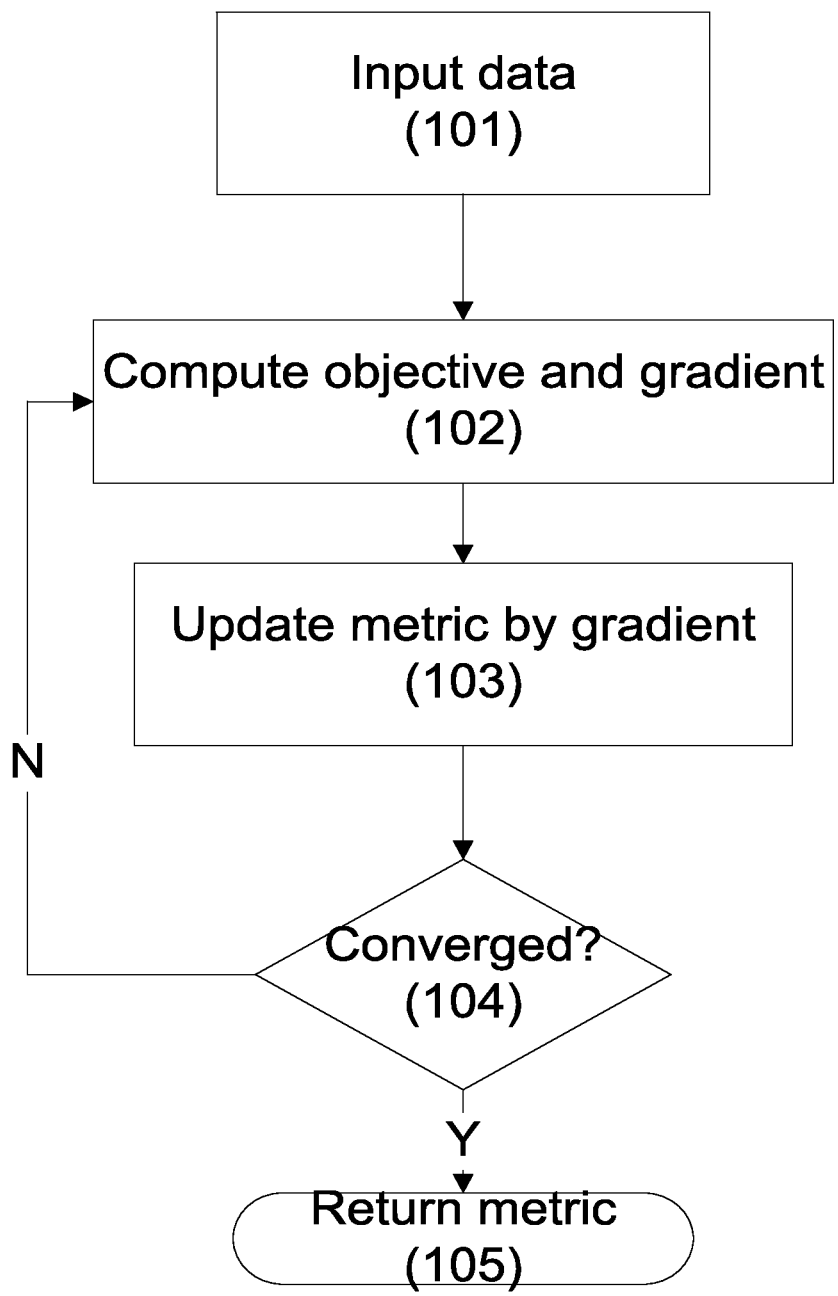
FIG. 1 shows an exemplary method to process learning metrics.

FIG. 1 shows an exemplary method to generate learning metrics. The process receives input data (101). With the input, the process determines objective and gradient data (102). The metric is updated using gradient (103). In 104, the process checks for convergence. If not, the process loops back to 102 to continue determining objective and gradient data. If convergence is reached, the process exits and returns the desired metric (105). The operation 102 in FIG. 1 is detailed in FIGS. 2-3.

Figure 2:
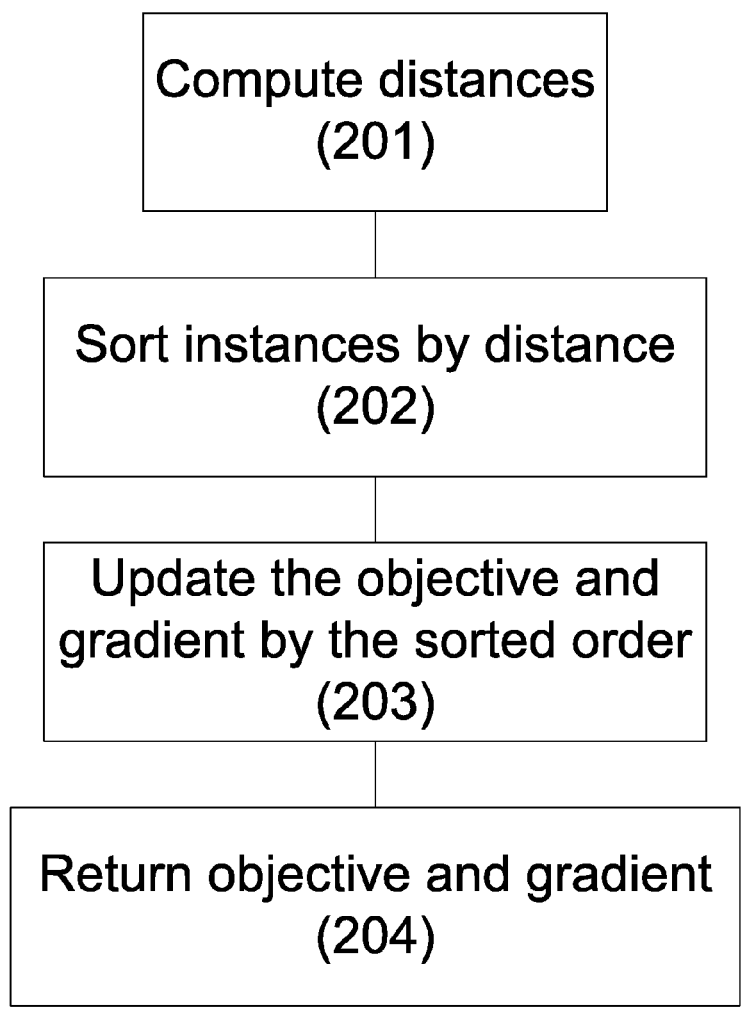
FIG. 2 shows an exemplary method to determine objective and gradient for a hinge loss case.

FIG. 2 shows an efficient method to compute objective and gradient for hinge loss case. The process of FIG. 2 efficiently computes gradients for nearest-neighbor-based approaches using hinge loss function. The process reduces the computation to the similar magnitude as those pairwise-based approaches. The invention uses sorted order by distance as done in Step (202) and (203). This reduces computation complexity from $O(N^3 p)$ to $O(N^2 p)$. In FIG. 2, the process determines distances between the data points (201). The process then sorts instances by distance (202). The objective and gradient is updated by a sorted order (203). The process then returns the objective and gradient to the process of FIG. 1 (204).

Figure 3:
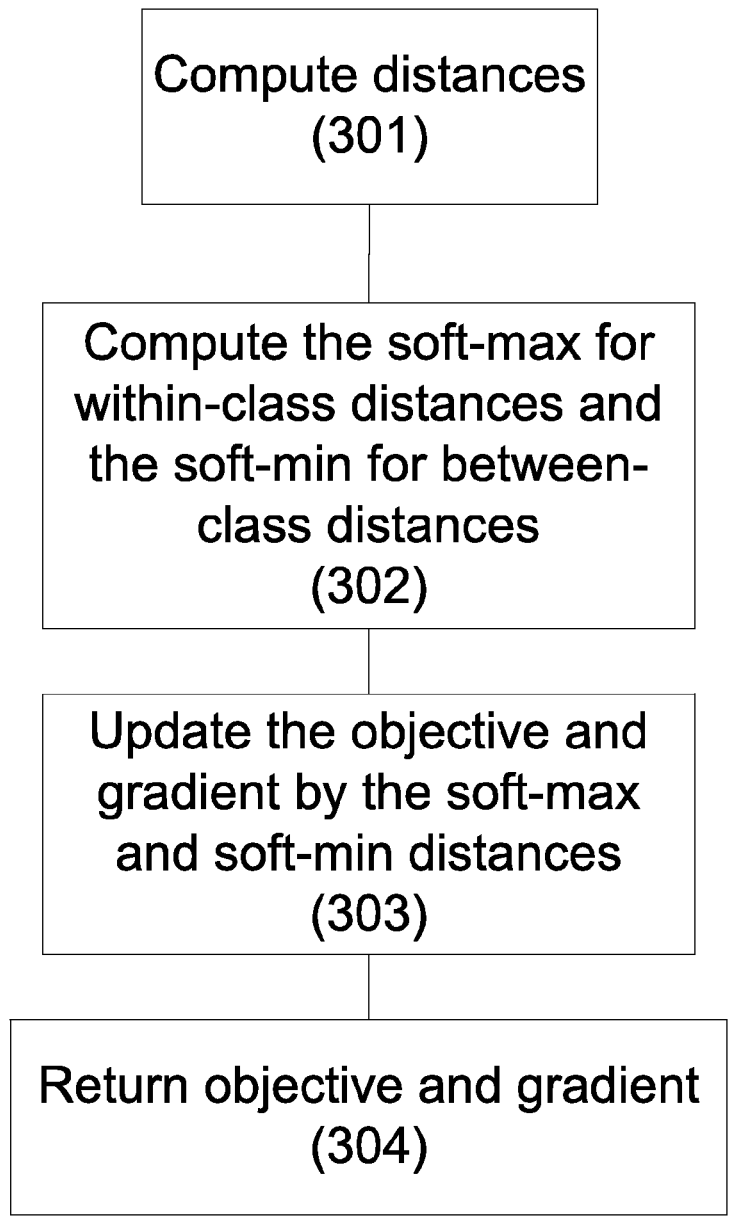
FIG. 3 shows an exemplary method to determine objective and gradient for an exponential-based loss case.
Figure 4:
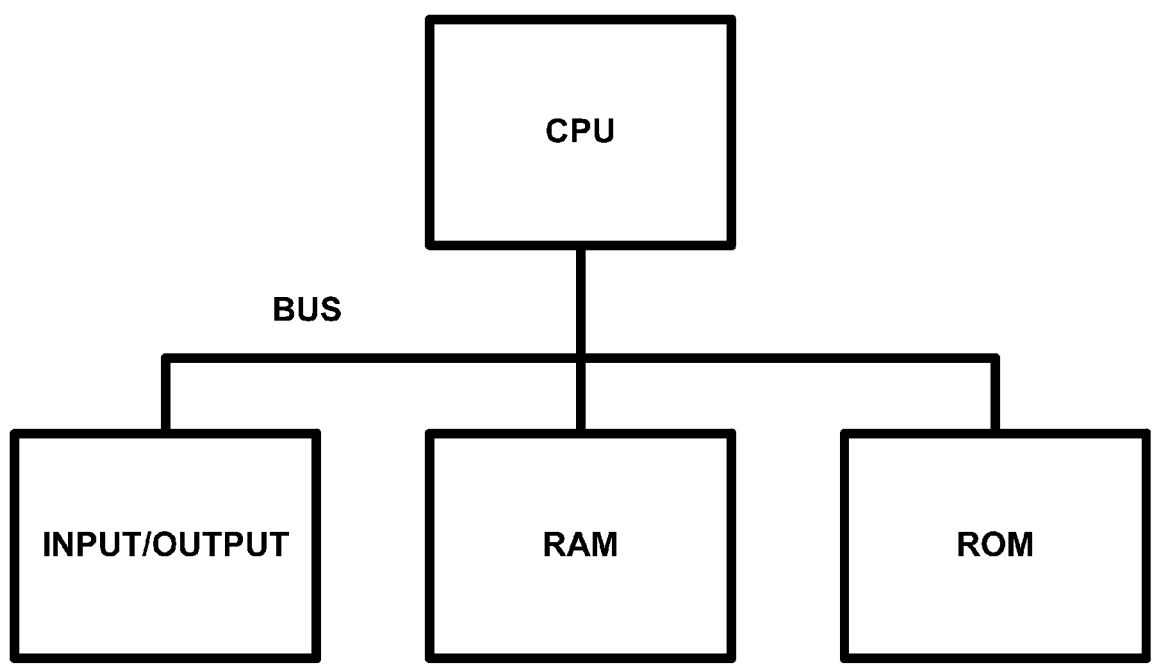

FIG. 3 shows an exemplary method to determine objective and gradient for an exponential-based loss case. The process first determines distances between data points (301). The process then determines the soft-max for within class distances and the soft-min for between class distances (302). The process then updates the objective and gradient using the soft-max and soft-min distances (303). The process then returns Other embodiments computes gradient for smooth surrogate functions. The smoothness of those loss functions makes it possible to use Nesterov's method to achieve a faster convergence rate.

Next, details of the distance determination are discussed. One embodiment uses asquared distance metric, defined as $d^2(x,y; A) = (x-y)^T A(x-y)$ for all pairs of instances x and y, where A is positive semi-definite p×p matrix. The nearest-neighbor error is $$\epsilon = Pr(d^2(y,x;A) \geq d^2(z,x;A) | y \sim x, z \setminus \sim x), \quad (1)$$

where $y \sim x$ denotes that x and y belongs to the same class, $z \setminus \sim x$ denotes that z belong to another class. Usually, we make an assumption that y is uniformly sampled from the class that x belongs to and z is uniformly sampled from any class that x does not belong to. The goal of this metric learning problem is to learn the parameter A from a set of N training instancesto minimize the error $\epsilon$ in Eq. (1).

$\phi$ be a nondecreasing surrogate function,and $\phi(0)=1$.
By Markov inequality,nearest neighbor error is
bounded by $l(A)+R_N$ (2)

where $l(A) = E_{x,y \sim x, z \setminus \sim x} \phi(d^2(y,x; A) - d^2(z,x; A))$ is the true expectation over all instances, and $R_N$ is the generalization error.

The concept of target neighbors is introduced to choose y from a subset of instances in the same class which are close to instance x. With this concept, we modify the notation $y \sim x$ as y is a target neighbor of x, where y is assumed to be uniformly sampled from the target neighbors of x. Our tests show that choosing more target neighbors (or all same-class instances) is preferred when the dimension is high and/or the number of exemplar instances is small.

To minimize the prediction error, the regularized framework in Eq. (3) minimizes l(A) and control $R_N$, according to the analysis of the generalization error in Section 3.

$$\min_A f(A) = \frac{\lambda}{2}\|A\|_F^2 + l(A) \quad (3)$$
$$\text{subject to } A \succ 0, tr(A) \leq C,$$

where $\|A\|_F$ is the Frobenius norm of A, which ensures the generalization error, and the trace tr(A) further controls the generalization error and enforce that A is of low rank. Let A be the matrix that optimizes f. For simplicity, $d^2(x,y;A)$ becomes $d^2(x,y)$.

To solve the constrained problem of Eq. (3), we can use projected gradient descent method. In each step, the process performs a projection after a gradient step.

An efficient process for Hinge Loss is discussed next. When we use hinge loss function $\phi(\xi)=[1+\xi]_+$, Problem (3) differs from the large margin nearest neighbor classifier (LMNN) by normalization, regularization and trace constraint. LMNN does not normalize the loss for each instances. In practice, when the number of targeted neighbors for each class is the same, the overall empirical loss of LMNN and that in Eq. (2) are not much different as long as no class dominates in the dataset. In more general cases, Eq. (2) proves that the normalized loss can bound the expected error. In addition, LMNN uses the total within-class squared distance as regularization, while we use Frobenius norm as regularization based on the generalization analysis. The trace constraint is used to enforce the low rank, and has certain effect on the generalization error based on our analysis.

In one embodiment, the loss function and its gradient can be written as $$l = E_{x,y\sim x}\frac{1}{N_{x-}}\left[(1+d^2(y,x))|Z_{x,y}| - \sum_{z\in Z_{x,y}} d^2(z,x)\right]$$

$$\dot{l} = E_{x,y\sim x}\frac{1}{N_{x-}}\sum_{z\in Z_{x,y}}\{(y-x)(y-x) - (z-x)(z-x)\}$$

$$= \sum_{x,v} w_{x,v}(v-x)(v-x) = X(S-W-W)X$$

where $Z_{x,y}$ is the set of data not belonging to the class of x and satisfying $1+d^2(y,x)\geq d^2(z,x)$, $Y_{x,z}$ is the set of data belonging to the same class of x and satisfying $1+d^2(y,x)\geq d^2(z,x)$, $w_{x,v}$ is $$\frac{|Z_{x,v}|}{NN_{x+}N_{x-}}$$

if v in the same class of x, $$-\frac{|Y_{x,v}|}{NN_{x+}N_{x-}}$$

if v is not in the same class as x. X is an p×N matrix whose j-th column is the feature vector of $x_j$, W is an N×N matrix whose i,j-th element is $w_{x_i,x_j}$ (or simply written as $w_{ij}$), S is an N×N diagonal matrix whose i-th diagonal element is $\Sigma_j(w_{ij}+w_{ji})$, and $NN_{x+}$ is the size of class of x, $N_{x-}$ is the size of data not in the class of x.

The efficient computation of the loss function and its gradient efficiently depends on whether we can compute all $|Y_{x,z}|$, $|Z_{x,y}|$ and $\Sigma_{z\in Z_{x,y}}d^2(z,x)$ within O(N) time for any give instance x. It does not require to compare $d^2(y,x)$ with $d^2(z,x)$ for all y and all z for any given x, if we sort them by squared distances, and compute those terms incrementally. The total computation is within $O(N^2p+N^2\log N+Np^2)$ time Pseudo code for one exemplary process to determine objective and gradient of LMNN is as follows:

```
1: f ← λ/2 ||A||²_F and T ← λA, s be a zero vector of size N;

2: for i:x_i ∈ D do
3:    compute distance d_il² = d²(x_i, x_l) for all l;
4:    sort queues P = {l:x_l∼x_i} and Q = {l:x_l≁x_i} by d_il²;
5:    Z = N|P||Q|; t ← 0; n ← 0; j ← pop(P); k ← pop(Q);
      v be a zero vector of size N;
6:    while j ≠ 0 do
7:       if k ≠ 0 and d_ik² ≤ d_ij² + 1 then
8:          t ← t + d_ik²; n ← n + 1; v_k ← -(1 + |P|)/Z; k ← pop(Q);
9:       else
10:         f ← f + (nd_ij² + n - t)/Z; v_j ← n/Z; j ← pop(P);
11:      end if
12:   end while
13:   s ← s + v; s_i ← s_i + sum(v); T ← T - (Xv)^T x_i - x_i^T (Xv);
14: end for
15: return f and ḟ = T + X^T diag(s)X.
```

To achieve the optimal convergence rate, we need smooth surrogate functions. However, certain embodiments can not be modified to work for general surrogate functions. To achieve efficient computation for loss functions and their gradients, we introduce a special family of exponential-based smooth surrogate function. Let $\phi(\xi)=\psi(\exp(\xi))$, where $\psi$ be a concave nondecreasing function and $\psi(0_+)=0$, $\psi(1)=1$. Because of the concavity of $\psi$, we have $$l(A) = E_{x,y\sim x,z\backslash\sim x}\psi(\exp(d^2(y,x) - d^2(z,x))) \leq \quad (4)$$

$$E_x\phi(\delta_\pm(x))$$

$$= \tilde{l}(A),$$

where $$\delta_\pm(x) = \delta_+(x) - \delta_-(x), \delta_+(x)$$

$$= \ln\sum_{y\sim x}\exp(d^2(y,x)), \delta_-(x)$$

$$= -\ln\sum_{z\backslash\sim x}\exp(-d^2(z,x)).$$

Clearly, $\delta_+(x)$ is the soft-max of the square distances of all instances similar to x, and $\delta_-(x)$ is the soft-min of the square distances of all instances not similar to x. The concavity of $\psi$ allows us to reduce the comparison among the triples to the comparison between soft-max of within-distance and soft-min of between-distance, which enables us to efficiently compute the empirical loss function and its gradient within $O(N^2p+Np^2)$ time. The details are shown in the following examples of $\psi$:

1. $\psi(\xi)=\xi^\rho$, where $\rho\in(0,1]$. This is the exponential type of surrogate function. The gradient with respect to the squared distance is $$\frac{\partial \tilde{l}}{\partial d_{ij}^2} = \frac{\rho}{\exp\{(1-\rho)\delta_\pm(x_i)\}}\frac{\exp\{\rho(d_{ij}^2 - \delta_-(x_i))\}}{NN_{x_i+}}$$

$$= w_{ij}, \forall j:x_j\sim x_i$$

$$\frac{\partial \tilde{l}}{\partial d_{ik}^2} = \frac{\rho}{\exp\{(1-\rho)\delta_\pm(x_i)\}}\frac{-\exp\{\rho(\delta_+(x_i) - d_{ik}^2)\}}{NN_{x_i-}}$$

$$= w_{ik}, \forall k:x_k\backslash\sim x_i$$

2.

$$\psi(\xi) = \frac{\ln(1+\beta\xi)}{\ln(1+\beta)},$$

where $\beta>0$. This is the logit type of surrogate function. The gradient with respect to the squared distance is $$\frac{\partial \tilde{l}}{\partial d_{ij}^2} = \frac{\beta}{(1+\beta\exp(\delta_\pm(x_i)))\ln(1+\beta)} \frac{\exp(d_{ij}^2 - \delta_-(x_i))}{NN_{x_i+}}$$
$$= w_{ij}, \forall j: x_j \sim x_i$$

$$\frac{\partial \tilde{l}}{\partial d_{ik}^2} = \frac{\beta}{(1+\beta\exp(\delta_\pm(x_i)))\ln(1+\beta)} \frac{-\exp(\delta_+(x_i) - d_{ik}^2)}{NN_{x_i-}}$$
$$= w_{ik}, \forall k: x_k \setminus \sim x_i$$

For all these cases, $\tilde{l}(A)$ is convex with respect to A. The gradient matrix is $$\tilde{l} = \sum_{(x_i, x_j) \in x} w_{ij}(x_i - x_j)(x_i - x_j)^T = X(S - W - W)X \quad (5)$$

W is an N×N matrix whose i,j-th element is $w_{ij}$, S is an N×N diagonal matrix whose i-th diagonal element is $\Sigma_j w_{ij} + w_{ji}$.

For each instance, we can compute all distances within O(Np) time, each $\delta_+(x)$ and $\delta_-(x)$ within O(N) time, all $w_{ij}$ within O(N), and additional matrix gradient computation with $O(p^2)$. Thus the total time for $\tilde{l}$ and $\tilde{l}$ is $O(N^2p+Np^2)$. Given the above equations, the algorithm of computing the losses and its deritives should be straightforward, thus we do not list the pseudo code here. The memory consumption can be limited with $O(N+p^2)$.

In tests, we find the performance is usually sensitive to the choice of the number of target neighbors. For classification cases, if we have a large number of exemplar instances, a small number of target neighbors usually results into a better performance, because the exemplar instances far from the testing instance in the Euclidean metric are usually far from the testing instance in the learned metric when the dimension is low. Thus the uniform distribution assumption of selecting exemplar instances does not hold. The choice of smaller number of target neighbors can benefit the performance. However, in retrieval cases, the exemplar instance is just the query instance, therefore it is better to use most of the instances as the target neighbors, even if they are not that similar to the query instance.

The system is based on an analysis of the generalization error of nearest-neighbor-based distance metric learning approaches. The analysis suggests to use the regularized minimization framework for distance metric learning to control the generalization error. The system uses efficient techniques to compute objective loss functions and their gradients for hinge, exponential and logit loss with $O(N^2p+Np^2+p^3)$ time and $O(N+p^2)$ working memory. Embodiments of the system use the smooth surrogate functions for faster convergence rates than that nonsmooth hinge loss function. Tests confirm the accuracy of these approaches and the efficiency of the computation.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A nearest-neighbor-based distance metric learning process implemented by a computer, comprising:
    applying an exponential-based loss function to provide a smooth objective; and
    determining an objective and a gradient of both hinge-based and exponential-based loss function in a quadratic time of the number of instances using a computer;

wherein the loss function and its gradient comprises:

$$l = E_{x,y \sim x} \frac{1}{N_{x^-}} \left[ (1 + d^2(y, x))|Z_{x,y}| - \sum_{z \in Z_{x,y}} d^2(z, x) \right]$$

$$\dot{l} = E_{x,y \sim x} \frac{1}{N_{x^-}} \sum_{z \in Z_{x,y}} \{(y-x)(y-x) - (z-x)(z-x)\}$$

$$= \sum_{x,v} w_{x,v}(v-x)(v-x) = X(S - W - W)X$$

where d is distance, x and y are data points, z is sampled from a class which x does not belong to, $Z_{x,y}$ is the set of data not belonging to the class of x and satifying $1+d^2(y,x) \geq d^2(z,x)$, $w_{x,v}$ is $$\frac{|Z_{x,v}|}{NN_{x+}N_{x-}}$$

if v in the same class of x, $w_{x,v}$ is $$-\frac{|Y_{x,v}|}{NN_{x+}N_{x-}}$$

if v is not in the same class as x, X is an p×N matrix whose j-th column is the feature vector of $x_j$, W is an N×N matrix whose i,j-th element is $w_{x_j x_j}$, S is an N×N diagonal matrix whose i-th diagonal element is $\Sigma_j(w_{ij}+w_{ji})$, $NN_{x+}$ is the size of class of x, $N_{x-}$ is the size of data not in the class of x, and E is the expection over values x,y$^{\sim x}$.

2. The method of claim 1, using an ordered list of instances sorted by distance to determine the objective and gradient of a hinge-based loss function.

3. The method of claim 1, comprising using a sorted order to determine the objective and gradient.

4. The method of claim 1, comprising applying an exponential-based loss function for learning metrics.

5. The method of claim 4, comprising using a class soft-max distance and between-class soft-min distance to determine the objective and gradient.

6. The method of claim 1, comprising using the learned distance metric to classify, recognize or retrieve data.

7. The method of claim 1, wherein regularization terms and constraint terms control generalization error and reduce overall error.

8. The method of claim 1, comprising determining an exponential type of surrogate function
$\psi(\xi) = \xi^\rho$, where $\rho \in (0,1]$ where the gradient with respect to the squared distance is $$\frac{\partial \tilde{l}}{\partial d_{ij}^2} = \frac{\rho}{\exp\{(1-\rho)\delta_\pm(x_i)\}} \frac{\exp\{\rho(d_{ij}^2 - \delta_-(x_i))\}}{NN_{x_i+}}$$

$$= w_{ij}, \forall j : x_j \sim x_i$$

$$\frac{\partial \tilde{l}}{\partial d_{ik}^2} = \frac{\rho}{\exp\{(1-\rho)\delta_\pm(x_i)\}} \frac{-\exp\{\rho(\delta_+(x_i) - d_{ik}^2)\}}{NN_{x_i-}}$$

$$= w_{ik}, \forall k : x_k \setminus \sim x_i$$

where $\delta_+(x)$ is the soft-max of the square distances of all instances similar to x, and $\delta_-(x)$ is the soft-min of the square distances of all instances not similar to x, $\psi$ is a concave function, and i,j are matrix elements.

9. The method of claim 1, comprising determining a gradient matrix as $$\dot{l} = \sum_{x_i, x_j} w_{ij}(x_i - x_j)(x_i - x_j)^T = X(S - W - W)X$$

where X is a p×N matrix whose j-th column is the feature vector of $x_j$, W is an N×N matrix whose i,j-th element is $w_{ij}$, S is an N×N diagonal matrix whose i-th diagonal element is $\Sigma_j w_{ij} + w_{ji}$.

10. A system to perform nearest-neighbor-based distance metric learning implemented with a computer, comprising:
  means for applying an exponential-based loss function to provide a smooth objective; and
  means for determining an objective and a gradient of both hinge-based and exponential-based loss function in a quadratic time of the number of instances using a computer;
wherein the loss function and its gradient comprises:

$$l = E_{x,y \sim x} \frac{1}{N_{x^-}} \left[ (1 + d^2(y, x))|Z_{x,y}| - \sum_{z \in Z_{x,y}} d^2(z, x) \right]$$

$$\dot{l} = E_{x,y \sim x} \frac{1}{N_{x^-}} \sum_{z \in Z_{x,y}} \{(y-x)(y-x) - (z-x)(z-x)\}$$

$$= \sum_{x,v} w_{x,v}(v-x)(v-x) = X(S - W - W)X$$

where d is distance, x and y are data points, z is sampled from a class which x does not belong to, $Z_{x,y}$ is the set of data not belonging to the class of x and satifying $1+d^2(y,x) \geq d^2(z,x)$, $w_{x,v}$ is $$\frac{|Z_{x,v}|}{NN_{x+}N_{x-}}$$

if v in the same class of x, $w_{x,v}$ is $$-\frac{|Y_{x,v}|}{NN_{x+}N_{x-}}$$

if v is not in the same class as x, X is an p×N matrix whose j-th column is the feature vector of $x_j$, W is an N×N matrix whose i,j-th element is $w_{x_i x_j}$, S is an N×N diagonal matrix whose i-th diagonal element is $\Sigma_j(w_{ij}+w_{ji})$, $NN_{x+}$ is the size of class of x, $N_{x-}$ is the size of data not in the class of x, and E is the expection over values x, $y^{\sim x}$.

11. The system of claim 10, comprising:
  means for adding regularization term to ensure the generalization error; and
  means for adding trace norm constraints to ensure the generalization error.

12. The system of claim 10, comprising means for learning metric with an exponential-based loss function and means for using class soft-max distance and between-class soft-min distance to determine the objective and gradient.

13. The system of claim 10, comprising means for using the learned distance metric to classify, recognize or retrieve data.

* * * * *